United States Patent [19]

Jones et al.

[11] Patent Number: 4,944,082
[45] Date of Patent: Jul. 31, 1990

[54] METHOD OF PROVIDING A SHEET METAL HOUSING WITH PRECISELY POSITIONED MOUNTING REFERENCES

[75] Inventors: David P. Jones; Mark E. Wanger, both of Fort Collins, Colo.

[73] Assignee: Hewlett Packard Co., Palo Alto, Calif.

[21] Appl. No.: 344,191

[22] Filed: Apr. 27, 1989

[51] Int. Cl.⁵ .............................................. B23Q 3/00
[52] U.S. Cl. ........................................ 29/467; 29/464; 211/41; 269/40
[58] Field of Search .............. 211/41; 29/281.1, 281.4, 29/281.5, 462, 464, 467; 269/40

[56] References Cited

U.S. PATENT DOCUMENTS

| | | | |
|---|---|---|---|
| 3,878,600 | 4/1975 | Gilbert | 29/460 |
| 4,544,066 | 10/1985 | Koppensteiner et al. | 211/41 |
| 4,700,275 | 10/1987 | Wood | 361/393 |

FOREIGN PATENT DOCUMENTS 1202926  8/1970  United Kingdom ................. 29/464

Primary Examiner—Joseph M. Gorski
Assistant Examiner—S. Thomas Hughes
Attorney, Agent, or Firm—William W. Cochran, II

[57] ABSTRACT

A sheet metal housing for an optical disk storage and handling apparatus which includes reference deformations provided in the sidewall panels of the sheet metal housing for locating mutually registerable components of the optical disk storage and handling system. A method of constructing such a sheet metal housing is also described.

11 Claims, 5 Drawing Sheets

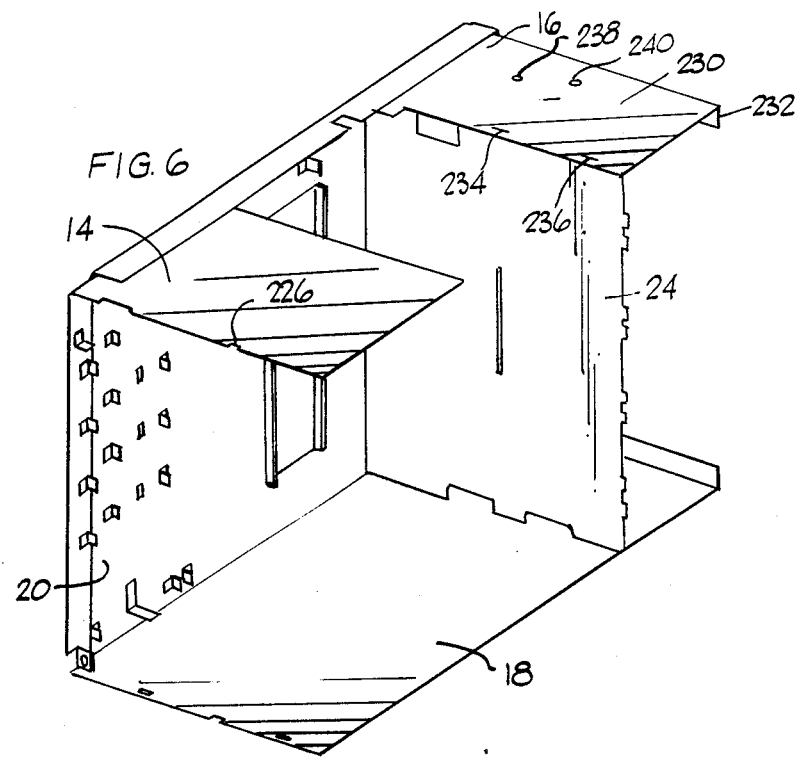
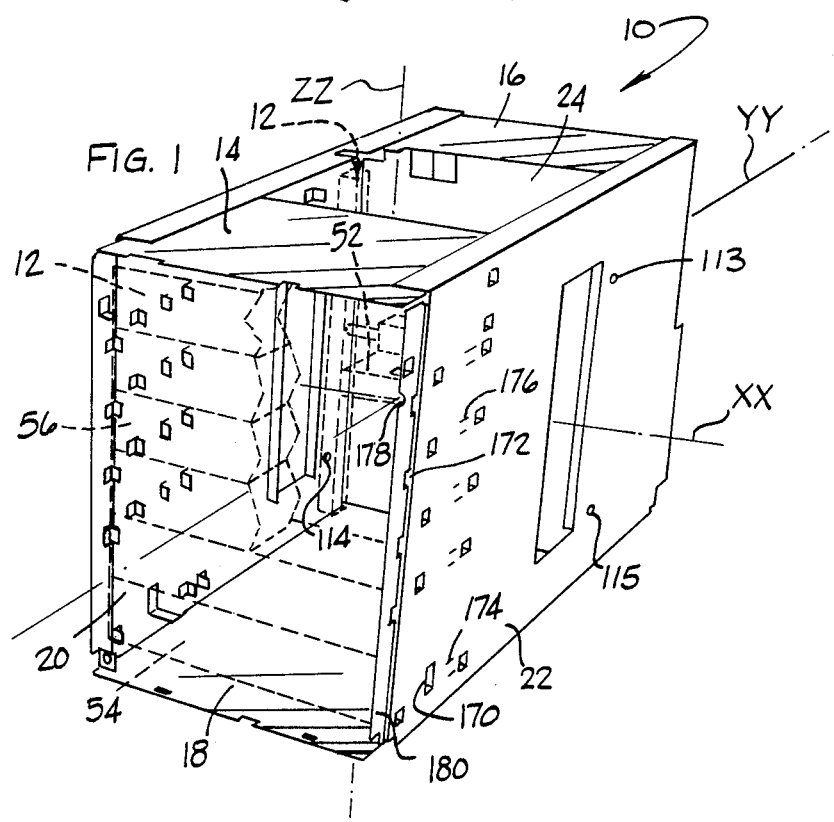

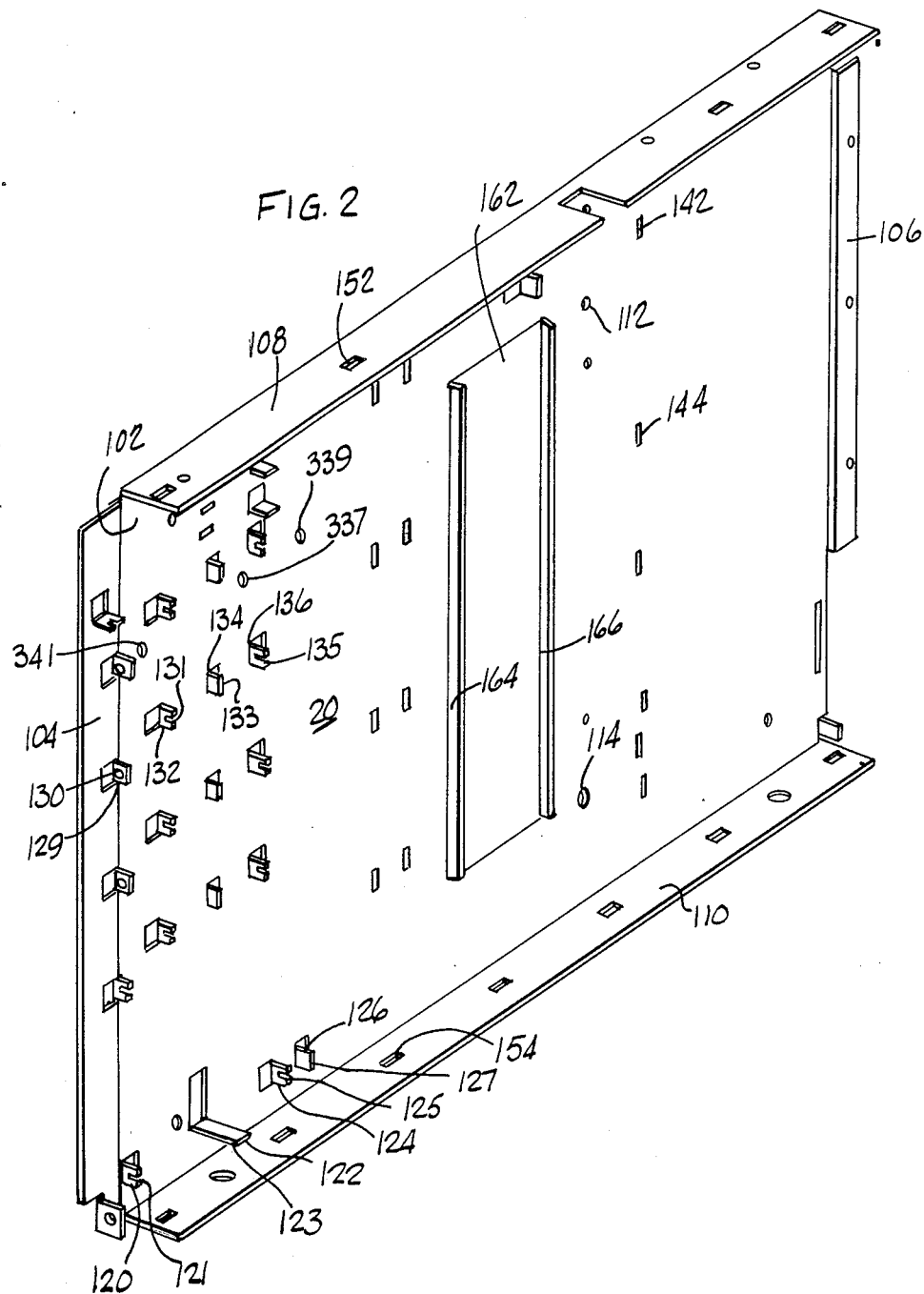

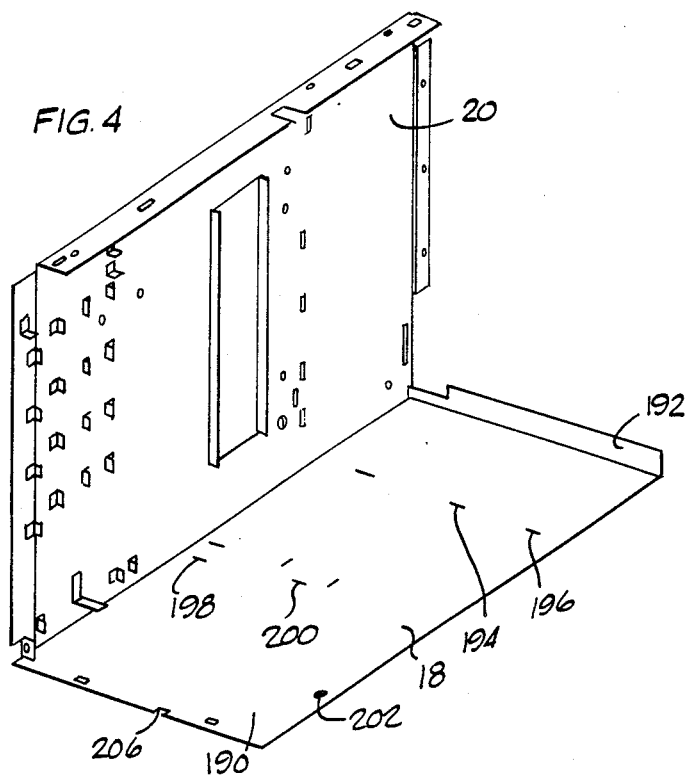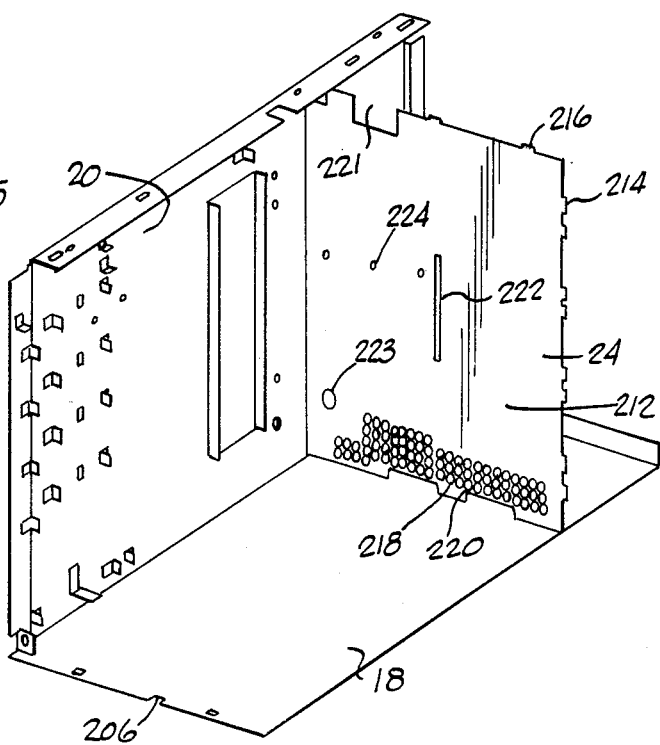

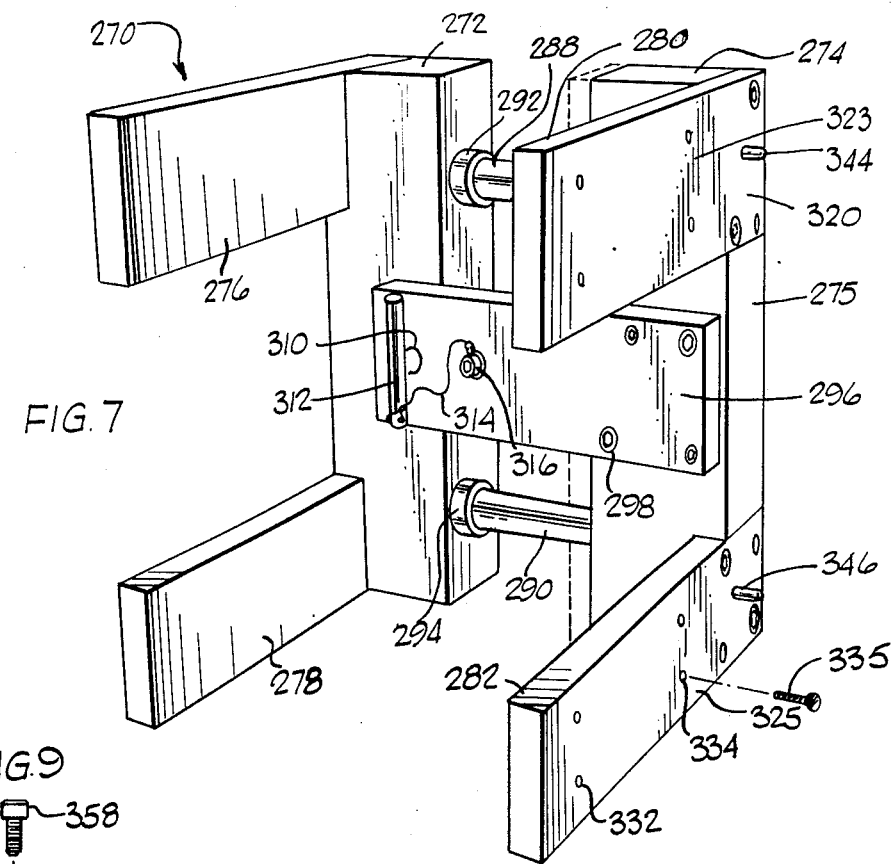
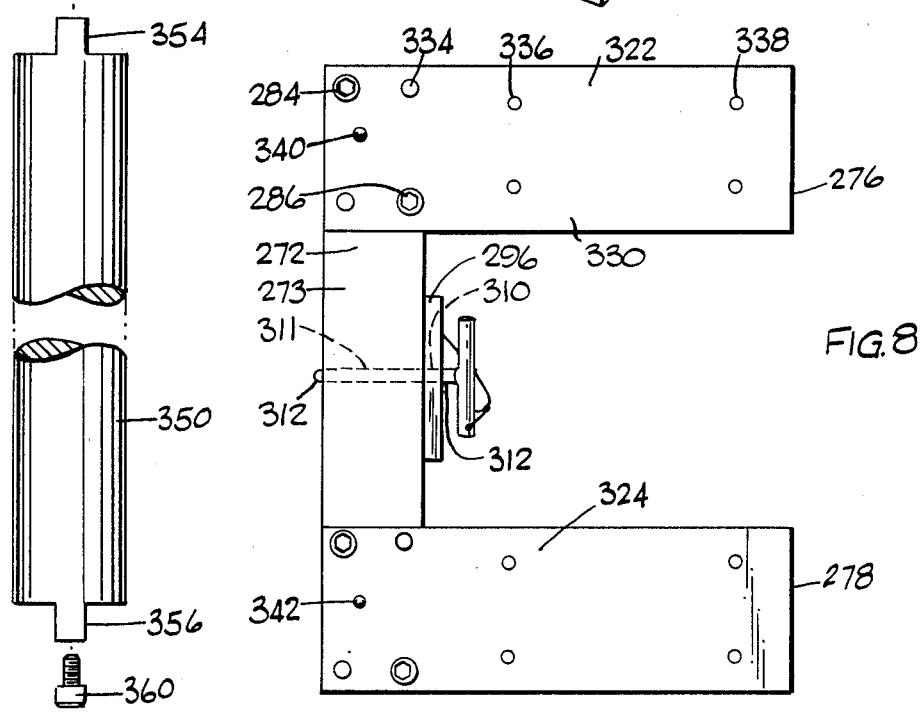

METHOD OF PROVIDING A SHEET METAL HOUSING WITH PRECISELY POSITIONED MOUNTING REFERENCES

BACKGROUND OF THE INVENTION

The present invention relates generally to housings for computer peripherals and, more particularly, to a sheet metal housing for an optical disk handling apparatus having a moving assembly adapted to be positioned in registry with portions of a separately mounted static assembly.

U.S. patent application Ser. No. 314,012 filed 2/22/89 for CARTRIDGE HANDLING SYSTEM of Wanger et al., which is hereby specifically incorporated by reference for all that is disclosed therein, describes an optical disk storage and handling system. In that system, optical disks are transferred between a storage rack and a reading device by means of an automated handling assembly. In such an optical disk storage and handling system, the storage rack and reading device must be positioned at precisely referenced locations with respect to the stationary components of the handling assembly to ensure proper registry during disk transfer operations.

In most computer peripheral devices in which a moving assembly is to be referenced to another, separately mounted assembly, it is conventional to provide a large rigid reference base member upon which the different assemblies are mounted. Such a base member provides a common, stable frame of reference for the various assemblies which are to be referenced with one another. Reference base members are typically formed by machining of large cast metal blocks.

Subsequent to mounting the various separate assemblies on the reference base member, a housing constructed from less rigid material such as, for example, sheet metal, plastic or the like, is mounted on the base member to enclose the different assemblies. Due to the considerable cost of fabricating such reference base members, and also due to the considerable weight of such base members, it would be desirable to find an alternative method of providing accurate apparatus mounting references.

OBJECTS OF THE INVENTION

It is an object of the present invention to provide a sheet metal housing with precisely positioned mounting references for accurately locating components of an optical disk storage and handling system.

It is another object of the present invention to provide a method of constructing a sheet metal housing having precisely positioned mounting references.

It is another object of the present invention to provide a sheet metal housing which obviates the need for heavy base reference members.

It is another object of the present invention to provide a sheet metal housing with precisely positioned mounting references provided in lateral sidewall portions of the sheet metal housing.

It is another object of the present invention to provide a sheet metal housing which is extremely rugged and reliable, which is relatively lightweight, and which is relatively inexpensive to produce as compared to conventional housing structures for computer peripheral devices having separately mounted registerable components.

SUMMARY OF THE INVENTION

The present invention is directed to a sheet metal housing and a method of construction thereof which enables accurate location of separately mounted, mutually registerable components of an apparatus, using only the sheet metal housing itself as a reference.

Thus, the invention may comprise a method of providing a sheet metal housing with precisely positioned mounting references for accurately locating components of an apparatus which includes the following steps:

(1) Providing first and second sheet metal wall panels.
(2) Forming a pair of housing assembly reference deformations at precise, predetermined positions on each of the wall panels.
(3) Forming apparatus locating deformations on each of the first and second wall panels at precise predetermined locations relative to the pair of housing assembly reference deformations on each wall panel.
(4) Mounting each of the wall panels on a predetermined portion of an assembly jig using the housing assembly reference deformations to precisely locate each wall panel on the jig.
(5) Fixedly attaching other sheet metal wall panels between the first and second sheet metal wall panels so as to provide a rigid housing structure with the first and second sheet metal wall panels held in a predetermined fixed relationship.
(6) Removing the assembly jig from engagement with the first and second sheet metal wall panels.

The invention may also comprise a sheet metal housing for an optical disk storage and handling apparatus which includes a top sheet metal wall panel, a bottom sheet metal wall panel, left and right sheet metal sidewall panels, and an intermediately positioned vertical sheet metal wall panel extending transversely of the sheet metal sidewall panels. Reference deformations are provided in the sidewall panels for locating separate, mutually registerable, mechanical components of the optical disk storage and handling system. The lateral sidewalls are precisely laterally, longitudinally and vertically positioned relative to one another. The mutually registerable mechanical components of the optical disk storage and handling system are referenced, for mounting purposes, exclusively to the reference deformations in the lateral sidewall panels.

BRIEF DESCRIPTION OF THE DRAWINGS

An illustrative and presently preferred embodiment of the invention is shown in the accompanying drawings in which:

FIG. 1 is a perspective view of a sheet metal housing.

FIG. 2 is a perspective view of a sidewall panel of a sheet metal housing.

FIG. 4 is a perspective view of a sidewall panel and bottom wall panel of a sheet metal housing.

FIG. 5 is a perspective view of a sidewall panel, bottom wall panel, and transverse wall panel of a sheet metal housing.

FIG. 6 is a perspective view of a sidewall panel, bottom wall panel, transverse wall panel, and two separate top wall panels of a sheet metal housing.

FIG. 7 is a perspective view of a housing assembly jig.

FIG. 8 is a side elevation view of a housing assembly jig.

FIG. 9 is an elevation view of a brace member used for spacing the sidewall panels of a sheet metal housing during assembly thereof.

Figure 3:
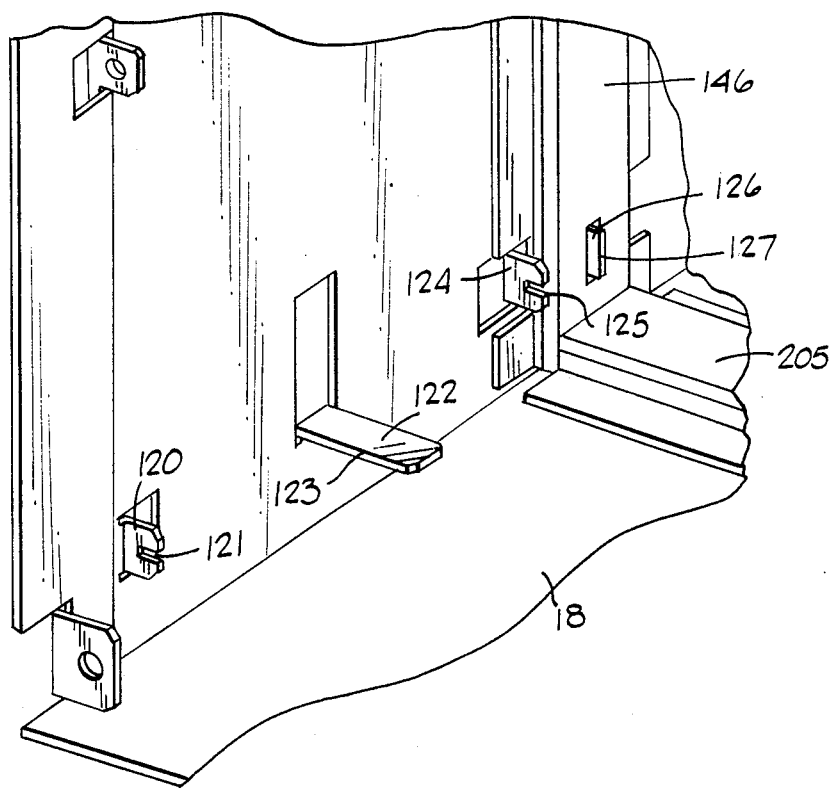
FIG. 3 is a detail perspective view of portions of a sidewall panel and bottom wall panel of a sheet metal housing.

DETAILED DESCRIPTION OF THE INVENTION The invention in General

FIG. 1 illustrates a sheet metal housing 10 for an optical disk storage and handling apparatus 12, such as described in U.S. patent application Ser. No. 314,012 of Wanger et al. and incorporated by reference above. In general, the sheet metal housing 10 comprises first and second top sheet metal wall panels 14, 16, a bottom sheet metal wall panel 18, a left lateral sheet metal wall panel 20, a right lateral sheet metal wall panel 22, and an intermediately positioned, transverse sheet metal wall panel 24. Apparatus locating deformations 112–115, 120, 122, 130, 132, etc., are provided in the lateral sidewall panels 20, 22 for precisely locating separately mounted mechanical components 52, 54, 56 of the optical disk storage and handling system 12. Portions of static mechanical components 54, 56 are adapted to be placed in registration with movable, portions of mechanical component 52 during handling system operation. The lateral sidewalls 20, 22 are precisely laterally (XX), longitudinally (YY), and vertically (ZZ) positioned relative to one another. The mutually registerable machine components 52, 54, 56 of the optical disk storage and handling system 12 are referenced exclusively to the apparatus locating deformations in the lateral sidewall panels 20, 22.

The method of constructing such a sheet metal housing with precisely positioned mounting references comprises initially providing first and second sheet metal wall panels 20, 22 having a predetermined shape. A pair of housing assembly reference deformations such as holes 112, 114 and 113, 115 are provided at precise predetermined positions on each of the wall panels 20, 22, FIGS. 1 and 2. Apparatus locating deformations, e.g. 130, 132, 134, 136, 172, etc., are provided on the wall panels 20, 22 at precise, predetermined locations relative to the housing assembly reference deformations 112, 114, etc. Each of the wall panels 20, 22 is mounted on a predetermined portion of an assembly jig 270, FIG. 7, using the associated pair of housing assembly reference deformations 112, 114 and 113, 115 to precisely locate each wall panel on the jig. Other sheet metal wall panels 14, 16, 18, 24 are then fixedly attached at predetermined locations to the first and second sheet metal wall panels 20, 22 so as to provide a rigid housing structure 10 in which the first and second sheet metal wall panels are held in a predetermined, fixed, rigid relationship with one another. Next, the jig assembly 270 is removed from engagement with the first and second sheet metal wall panels 20, 22 and the various machine components 52, 54, 56, etc., are mounted at the various apparatus locating deformations 122, 124, etc. In one embodiment of the invention, housing assembly reference deformations 112, 114 and 113, 115 also function as apparatus locating deformations.

Having thus described the method and apparatus of the present invention in general, various specific features thereof will now be described in further detail.

Sheet Metal Housing

As illustrated in FIG. 2, the sheet metal housing comprises a left sidewall panel 20 which, in the presently preferred embodiment, is constructed from 1.9-millimeter-thick sheet steel. The left sidewall panel 20 has a flat central body portion 102, which may have a length of 672.3 millimeters and a height of 448.5 millimeters; a forwardly extending front flange 104; a rearwardly extending rear flange 106; an inwardly extending top flange 108; and an inwardly extending bottom flange 110. A circular hole 112, which may be, e.g., 6.4 millimeters in diameter, is provided at a predetermined position on the central body portion 102 of panel 20. This position may be, e.g. 224.8 millimeters forward and 74.0 millimeters downward from the top rear edge of the flat central body portion 102. The circular hole 112 may comprise a first reference point which is used in assembling the housing. A second reference point which is to be used in assembling the housing may comprise a vertically elongated hole or slot 114 which is provided directly vertically below circular hole 112 at a predetermined distance therefrom, e.g. 300.5 millimeters, center to center. The slot 114 may have a longitudinal dimension of 6.4 millimeters and a vertical dimension of 12.0 millimeters, with the upper and lower ends thereof being semicircular in shape and having a radius of 3.2 millimeters. The reference holes 112, 114, as well as being used in assembling the housing, may also be used as mounting references for mounting a mechanical component 52 of the optical disk handling apparatus 12 as described in further detail below.

A plurality of other apparatus locating deformations are provided at a predetermined position on the flat central body portion 102 of the sidewall panel 20. Each of these other apparatus locating deformations is precisely referenced to the housing assembly reference deformations 112, 114. As illustrated in FIG. 2, the apparatus locating deformations may include first, second, third and fourth tabs 120, 122, 124, 126 which are used to precisely locate an optical disk reading assembly 54, FIG. 1. Tabs 120 and 124 comprise horizontal, laterally extending slots 121, 125 therein which are adapted to receive a locating tab (not shown) on the optical disk reading assembly 54 for precisely vertically locating the optical disk reading assembly 54. Tab 122 comprises a forward edge surface 123 which is adapted to abuttingly engage a predetermined surface portion of the reading assembly 54 to precisely longitudinally position the reading assembly. Tab 126 comprises a terminal end surface 127 which is adapted to abuttingly engage a predetermined surface portion of the reading assembly to precisely laterally position the reading assembly. In the illustrated embodiment, the housing 10 is adapted to receive a reading assembly 54 comprising two disk reading units mounted in side-by-side relationship. The left sidewall tab surface 127 provides a precise reference for the left side of the drive assembly 54. The right sidewall panel 22 has vertical and longitudinal locating tabs identical to tabs 122 and 126 of the left sidewall panel which are adapted to engage the right side of reading assembly 54. However, the right sidewall does not have deformations corresponding to lateral locating tab 126. Rather, leaf springs (not shown) are inserted between the reading assembly 54 and the right sidewall 22 to urge the reading assembly against left sidewall tab surface 127.

In the illustrated embodiment, the housing assembly 10 is also adapted to precisely locate a removable magazine assembly 56, FIG. 1, having eight optical disk storage locations arranged in two vertical columns consisting of four storage units each. The left sidewall panel 20 may comprise four substantially identical longitudinally extending rows of tabs which are adapted for precisely locating and mounting this optical disk magazine assembly. Each row of tabs includes a first, second, third and fourth laterally extending tab 130, 132, 134, 136. Tabs 132 and 136 each comprise a horizontal, laterally extending slit 131, 135 therein adapted to receive a thin horizontal plate portion (not shown) of the magazine assembly 56 for precisely vertically locating the magazine assembly. Tab 130 is adapted to receive the magazine assembly in abutting relationship therewith and comprises a screw hole 129 therein for securing the magazine assembly thereto for precisely longitudinally locating the magazine assembly. Tab 134 comprises a vertically extending terminal end surface 133 which is adapted to abuttingly engage a lateral side surface of the magazine assembly for precisely laterally locating the magazine assembly. The magazine assembly may be urged against the surface 133 of tab 134 as by biasing springs (not shown) which are positioned between the magazine assembly and the right sidewall panel 22.

Wall panel locating deformations for initially positioning the transverse wall panel 24 on the sidewall panel 20 prior to welding the wall panels together are provided in the form of a plurality of vertical slots 142, 144, etc., which are arranged in vertical alignment at predetermined positions relative to the housing assembly reference deformations 112, 114.

A stiffening member 146, FIG. 3, which extends substantially from the top flange 108 to the bottom flange 110 of the sidewall panel 20 may be welded to the central body portion 102, at the position illustrated in FIG. 3, prior to assembly of the various wall panels.

A plurality of welding cutouts 152, 154, etc., FIG. 2, are provided on the top and bottom flanges 108, 110 to facilitate welding attachment of top and bottom wall panels to the sidewall panel. A sidewall panel window cutout 162 having window flanges 164, 166 is provided to facilitate assembly of the various components of the internally mounted optical disk storage and handling apparatus 12 after assembly of the housing 10.

The right lateral sidewall panel 22, FIG. 1, is essentially a mirror image of the left sidewall panel 20 having housing assembly deformations 113, 115 corresponding exactly to deformations 112, 114 in the left sidewall panel 20. Sidewall panel 22 has tabs 170, 172, etc., corresponding to the tabs 120, 130, etc., in panel 20 used for locating the disk reading assembly 54 and storage magazine assembly 56 except that, rather than having lateral positioning tabs corresponding to tabs 126 and 134, etc., in the left sidewall panel 20, the right sidewall panel has locating nubs 174, 176, etc., which serve to locate biasing springs (not shown) which urge the storage magazine and the disk drive mounting assembly against the lateral positioning tabs 126, 134, etc., on the left sidewall panel. The right sidewall panel is provided with a stiffening member (not shown) corresponding to stiffening member 146 on the left sidewall panel. A feature found on the right sidewall panel which is not present on the left sidewall panel is a reference cutout 178 on the front flange 180 thereof which serves to precisely locate a front wall panel (not shown) which is attached to the housing 10 after assembly thereof. The reference cutout 178 is precisely referenced to housing assembly deformations 113, 115.

As illustrated in FIG. 4, the bottom wall panel 18 comprises a flat central body portion 190 having a rear flange 192 extending upwardly therefrom. Transverse wall 24 locating slots 194, 196, etc., are provided in lateral alignment on the central body portion 190. Other wall panel deformations 198, 200, 202, etc., for facilitating attachment of brace members and other non-reference-critical structure are provided on the flat central body portion 190. The relative assembled relationship between the bottom wall panel 18 and the left lateral sidewall panel 20 is illustrated in FIGS. 3 and 4. The bottom wall panel comprises a forward edge cutout 206 therein which is used for locating a front wall panel (not shown). The bottom wall panel may have a stiffening member 205 welded thereto at a position thereon which will place it in alignment with the welded members 146 (only one shown) on the sidewall panels, FIG. 3.

Intermediate transverse wall panel 24, as illustrated in FIG. 5, has a flat central body portion 212 with a plurality of peripheral tabs 214, 216 extending outwardly therefrom for facilitating initial location of the transverse wall panel with respect to other wall panels. A plurality of air holes 218, 220, etc., are provided in a lower portion of the vertical wall panel for facilitating air flow through the housing. Slots and holes 222, 224 facilitate mounting of various fans, motors, and support brackets on a rear surface of wall panel 24. Openings 221, 223 enable mechanical linkage of drive motors, mounted rearwardly of wall panel 24, to the displaceable optical disk handling assembly 52. In the preferred embodiment of the invention, none of the various openings provided in the vertical wall panel are used for locating any components of the apparatus 12 in which precise referencing is necessary.

Forward, top wall panel 14 comprises a flat plate which is adapted to be welded to the top flanges of the lateral sidewall panels 20, 22 as illustrated in FIGS. 1 and 6. Top wall panel 14 comprises a forward edge cutout 226 therein which is used for laterally locating a front wall panel (not shown).

The rear top wall panel 16 comprise a flat central body portion 230 having a downwardly extending rear flange 232. A plurality of laterally aligned slots 234, 236, etc., are provided for facilitating initial placement of the top wall panel 1 with respect to the transverse wall panel 24. Other reference-non-critical attachment holes 238, 240 are also provided in the top wall panel 16.

Jig Assembly

As illustrated in FIGS. 7-9, jig assembly 270 may comprise a pair of vertical steel blocks 272, 274. Left upper and lower wall panel alignment plates 276, 278, and right upper and lower wall panel alignment plates 280, 282 are received in cavities provided in the block members 272, 274 and are fixedly attached thereto as by attachment bolts 284, 286. A pair of horizontal, laterally extending shafts 288, 290 are fixedly attached to vertical block 274 and are slidingly received in bushings 292, 294 which are fixedly mounted in bores provided in vertical block 272. A cross plate 296 is fixedly attached as by bolts 298, etc., to vertical block 274. A hole 310 in a left-hand portion of cross plate 296 is adapted to be positioned in aligned relationship with a bore 311 in block 272 when the block members 272, 274 are positioned at a predetermined lateral spacing associated with the assembly of housing 10, as described in further detail hereinafter. A locking pin 312 is adapted to be closely, slidingly received within hole 310 and bore 311 to hold block member 272, 274 at this fixed lateral spacing. Locking pin 312 may be provided with a harness 314 attached to the plate 296 as by a bolt 316. The bushings 292, 294 enable the vertical block members to be relatively laterally displaced from one another, from the assembly position illustrated in solid lines in FIG. 7 to a more closely positioned relationship illustrated in phantom lines in FIG. 7, which may be, e.g. two inches closer.

Each block 272, 274 has a planar outer surface 273, 275 positioned in alignment with planar surfaces 322, 324 and 323, 325 of associated alignment plates 276, 278 and 280, 282, respectively. Attachment screw holes 332, 334, 336, 338, etc., are provided on the planar surfaces of each of the alignment plates for enabling attachment of associated housing sidewall panels with screws 335, etc., as described in further detail below. A dowel pin 340, 342 and 344, 346 is mounted on each alignment plate, projecting a small distance, e.g. 0.25 inches, perpendicularly from the associated planar surface of each plate. In a preferred embodiment of the invention, dowel pins 340 and 342 are located coaxially with pins 344 and 346, respectively. The dowel pins are adapted to be closely slidingly received within associated sidewall panel deformations 112–115.

As illustrated in FIG. 9, a pair of identical cross brace shaft members 350 (only one shown) may be provided which are used for accurately spacing front end portions of the housing sidewall panels 20, 22 during housing assembly. The cross brace members may each comprise narrow terminal end projections 354, 356 which are adapted to abuttingly engage associated portions of the housing sidewall panels 20, 22. Each of the narrow end projections has a threaded hole therein for enabling attachment of the end projections in abutting engagement to an associated sidewall panel by associated attachment screws 358, 360. The distance between terminal ends of each cross brace shaft member 350 may be identical to the spacing between the sidewall engaging planar surfaces 273, 275 of the vertical block members when the block members are positioned in the locked position illustrated in solid lines in FIG. 7.

Method of Assembling Housing

In one preferred embodiment of the invention, the housing assembly is assembled upside-down and the top surfaces of the vertical blocks of the jig assembly are placed on a support stand (not shown).

To assemble the housing 10, the left sidewall panel 20 is initially mounted with dowel pins 340 and 342 received through hole 112 and slot 114, and with the interior surface of wall panel 20 positioned in abutting engagement with planar surface 273 of vertical post 272 and planar surfaces 322 and 324 of alignment plates 276, 278. Next, sidewall panel 20 is secured against the associated abutment surfaces by use of machine screws 335, etc., received through holes 337, 339, etc., FIG. 2, in the side panel and associated holes, e.g. 336, 338, in the support plate.

Next, the transverse vertical wall panel 24 is loosely positioned in registration with the sidewall panel 20 by means of the slots 142, 144, etc., provided in the sidewall panel 20 and the associated tabs provided on the transverse vertical wall panel 24. Next, the right sidewall panel 22 is secured to the right-hand portion of the jig 270 in a manner identical to that in which the left sidewall panel 20 was secured to the left-hand portion of the jig. During mounting of the right sidewall 22 on the jig assembly, the associated tab portions of the transverse wall panel 24 are inserted into the associated vertical slots in the right sidewall panel 22.

Next, the brace members 350 (only one shown) are positioned at predetermined upper and lower forward end portions of the sidewall panels and held in fixed relationship therewith by associated set screws received through screw holes, e.g. 341, FIG. 2, in the sidewall panels 20, 22. The brace members thus serve as spacers for maintaining the forward ends of the sidewall panels 20, 22 in parallel relationship.

Next, the bottom wall 18 is laid loosely in position with the associated slots therein positioned in registry with the tabs on the bottom of the transverse wall panel 24.

Next, the top wall panels 14 and 16 are slipped into their appropriate positions with registration indicia (not shown) provided on the top panels 14, 16 positioned in registration with registration indicia (not shown) provided on the sidewall panels 20, 22.

Next, the wall panels 14, 16, 18, 20, 22 24 are welded together along the seams therebetween and at welding cutout areas, 152, 154, etc., to provide the rigid box-shaped housing assembly 10 shown in solid lines in FIG. 1.

Next, the lock pin 312 is removed from the jig fixture 270 and the vertical posts 272, 274 are moved laterally inwardly from the associated sidewall portions sufficiently far so as to remove the dowels 340, 342, 344, 346 from the associated receiving holes in the sidewall panels. Thereafter, the jig fixture is moved longitudinally forwardly within the housing assembly so as to remove it through the forward opening therein defined by wall panels 14, 18, 20 and 22.

Thus, a rigid sheet metal housing 10 having precisely located mounting references, e.g. 112–115, 120, 130, etc., has been provided. Next, the various mutually registerable components 52, 54, 56 of the apparatus 12 which is to be mounted in the housing structure are mounted at the various precisely positioned mounting references: vertical post portions of handling assembly 52 are mounted at references 112, 114 and 113, 115; disk reading assembly 54 is mounted at references 20, 170, etc.; and storage magazine assembly 56 is mounted at references 30, 172, etc. Thus, components 52, 54, 56 are positioned in precise, predetermined relationship and are referenced exclusively to portions of sidewall panels 20, 22.

In one preferred embodiment of the invention, the housing transverse wall panel 24, rear top wall panel 16, and rear portions of the sidewall panels 20, 22 and the bottom wall panel 18 define portions of a Faraday cage which is used to enclose RF-emitting components of the optical disk handling apparatus 12.

While an illustrative and presently preferred embodiment of the invention has been described in detail herein, it is to be understood that the inventive concepts may be otherwise variously embodied and employed and that the appended claims are intended to be construed to include such variations except insofar as limited by the prior art.

What is claimed is:

1. A method of providing a sheet metal housing with precisely positioned mounting references for accurately locating components of an internally mounted apparatus comprising the steps of:

(a) providing first and second sheet metal wall panels;

(b) forming a pair of housing assembly reference deformations at precise, predetermined positions on each of the wall panels;

(c) forming apparatus locating deformations on each of the first and second wall panels at precise predetermined locations relative to the pair of housing assembly reference deformations on each wall panel;

(d) mounting each of the wall panels on a predetermined portion of an assembly jig using the housing assembly reference deformations to precisely locate each wall panel on the jig;

(e) fixedly attaching other sheet metal wall panels between and to the first and second sheet metal wall panels thereby providing a rigid housing structure with the first and second sheet metal wall panels held in a predetermined fixed relationship;

(f) removing the assembly jig from engagement with the first and second sheet metal wall panels.

2. The invention of claim 1 wherein the step of mounting each of the wall panels on a predetermined portion of a mounting jig comprises placing each wall panel in abutting engagement with a different one of two, parallel, planar surface portions of the assembly jig.

3. The invention of claim 2 comprising the further step of positioning the two parallel planar surface portions of the assembly jig at a first predetermined spacing prior to mounting of the first and second wall panels on the assembly jig.

4. The invention of claim 3 further comprising the step of positioning the two parallel planar surface portions of the mounting jig at a second predetermined spacing different from the first predetermined spacing prior to removing the assembly jig from engagement with the first and second wall panels.

5. The invention of claim 1 wherein the first and second wall panels comprise sidewall panels and wherein the step of fixedly attaching other sheet metal wall panels comprises attaching a top wall panel, a bottom wall panel, and a transverse wall panel to the first and second sidewall panels.

6. The invention of claim 1 wherein the step of providing first and second sheet metal wall panels comprises providing panels of substantially identical size and shape.

7. The invention of claim 6 wherein the step of providing a pair of housing assembly reference deformations on each of the wall panels comprises providing reference deformations on the second housing panel corresponding in location to the reference deformations provided on the first housing panel.

8. The invention of claim 1 wherein the step of providing housing assembly reference deformations comprises providing holes adapted to receive locating studs which are provided on the assembly jig.

9. The invention of claim 1 wherein the step of providing apparatus locating deformations comprises providing tabs.

10. The invention of claim 1 wherein the step of providing apparatus locating deformations comprises providing holes.

11. The invention of claim 1 comprising the further step of providing wall panel locating deformations on the first and second wall panels at precise, predetermined locations relative to each pair of housing assembly reference deformations for facilitating the location of other wall panels on the first and second wall panels.

* * * * *